Oct. 3, 1961    A. DEMOPOULOS ET AL    3,002,262
METHOD OF MAKING A METAL DETECTOR SEARCH HEAD
Filed March 2, 1959    4 Sheets-Sheet 1
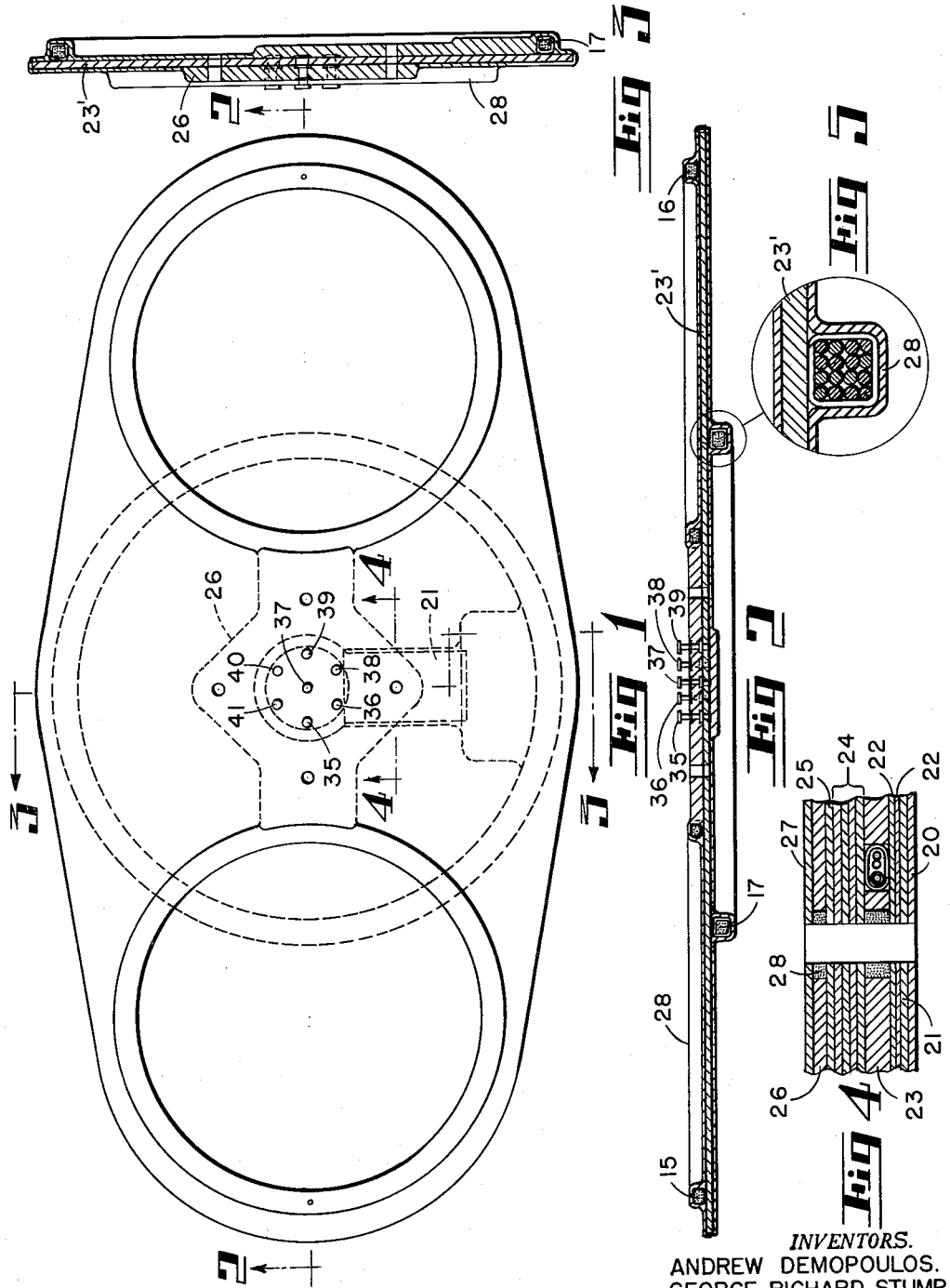
INVENTORS.
ANDREW DEMOPOULOS.
GEORGE RICHARD STUMP.
BY
ATTORNEYS.

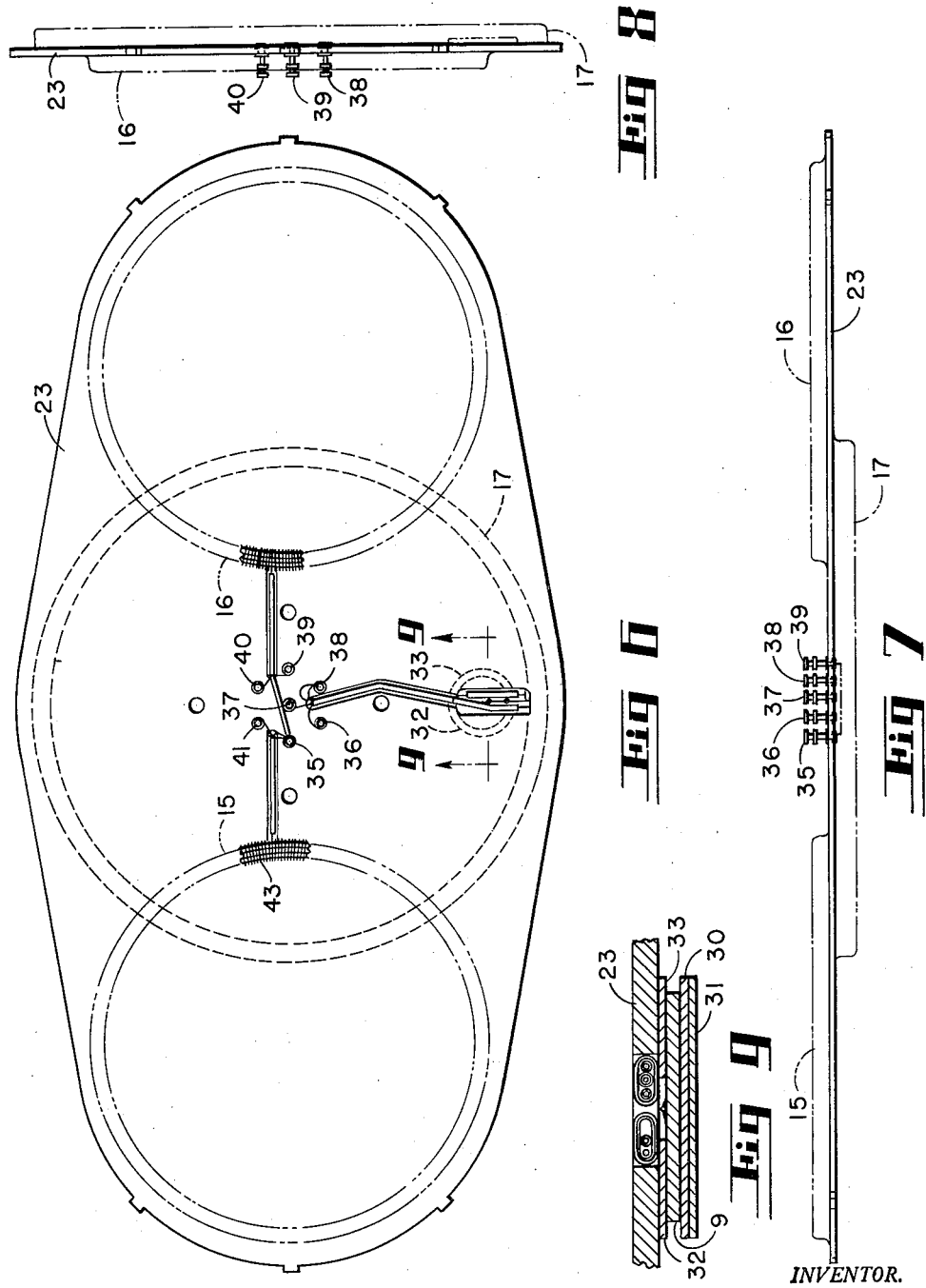
Oct. 3, 1961   A. DEMOPOULOS ET AL   3,002,262
METHOD OF MAKING A METAL DETECTOR SEARCH HEAD
Filed March 2, 1959   4 Sheets-Sheet 2
*INVENTOR.*
ANDREW DEMOPOULOS.
GEORGE RICHARD STUMP.
BY
ATTORNEYS Oct. 3, 1961  A. DEMOPOULOS ET AL  3,002,262
METHOD OF MAKING A METAL DETECTOR SEARCH HEAD
Filed March 2, 1959  4 Sheets-Sheet 3
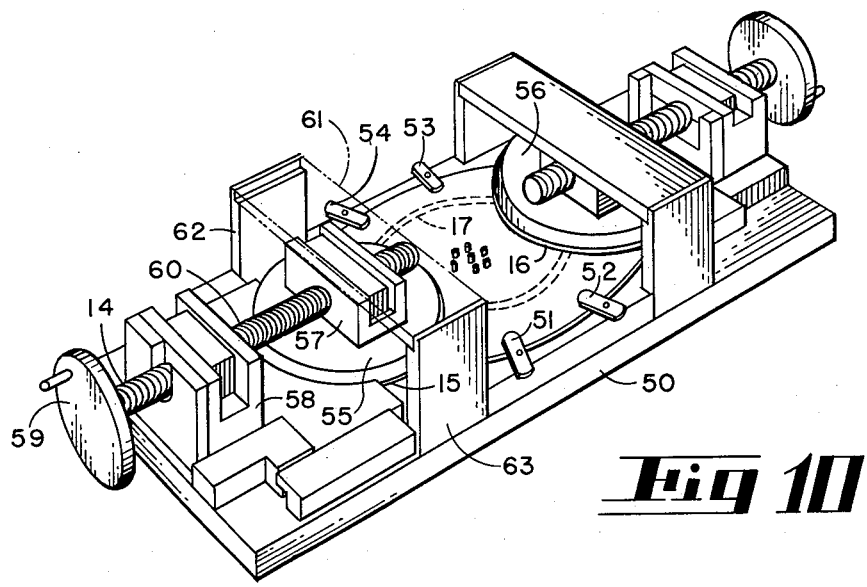
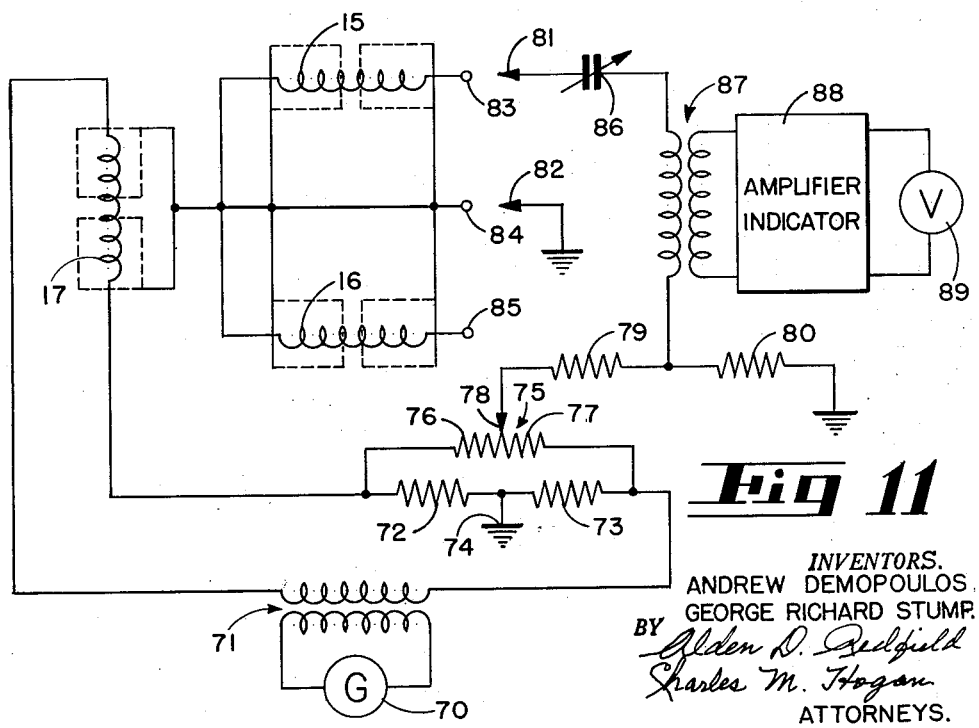
INVENTORS.
ANDREW DEMOPOULOS,
GEORGE RICHARD STUMP.
BY Alden D. Redfield
Charles M. Hogan
ATTORNEYS.

Oct. 3, 1961  A. DEMOPOULOS ET AL  3,002,262
METHOD OF MAKING A METAL DETECTOR SEARCH HEAD
Filed March 2, 1959  4 Sheets—Sheet 4

INVENTORS.
ANDREW DEMOPOULOS.
BY GEORGE RICHARD STUMP.
Alden D. Redfield
Charles M. Hogan.
ATTORNEYS.

United States Patent Office 3,002,262
Patented Oct. 3, 1961

3,002,262
METHOD OF MAKING A METAL DETECTOR SEARCH HEAD
Andrew Demopoulos and George Richard Stump, Cincinnati, Ohio, assignors to Avco Manufacturing Corporation, Cincinnati, Ohio, a corporation of Delaware
Filed Mar. 2, 1959, Ser. No. 796,641
1 Claim. (Cl. 29—155.5)

The present invention relates to mine detectors and particularly to a novel search head and method of manufacturing the same.

A typical search head of the type under consideration comprises a "transmit" and two "receive" coils. The principle of operation employed in such mine detectors depends upon an accurate null between transmitter and receiver coils when no target is present. The transmitter coil (17, FIGS. 1 and 2) is essentially centered with respect to the two receiver coils and located in a plane offset with respect to the plane of the receiver coils (15 and 16, FIGS. 1 and 2). That is to say, each of the receiver coils is positioned to effect substantially zero coupling between the transmitter coil and itself. The receiver coils are connected in series-opposition, so that they are balanced to a null output when no target is present, but so that they produce a resultant signal in the presence of targets having magnetically permeable or electrically conducting masses. That is, proximity of a magnetically permeable mass produces a net coupling between the transmit and receive coils. Proximity of an electrically conducting mass distorts the magnetic field of the transmitter coil, due to the eddy currents flowing in the conductive material. In either event, the detecting system coupled to the receiver coils produces an indication of the presence of a target.

This electrical operation establishes a requirement for a search head structure in which the coils are mechanically placed and maintained in position under the most rigorous service and environmental conditions. Extremely accurate placement of electrical components is required.

The necessity of a light-weight, waterproof unit further complicates the problem, because all known satisfactory molding operations involve shifting of parts due to flow and shrinkage of the molding compounds.

Accordingly, the principal object of the invention is to provide means for precise mechanical and electrical assembly of a stable, waterproofed search head suitable for target detection. Such means is of utility in manufacturing mine locators or any device dependent, for its operation, upon a change in magnetic path and/or dielectric characteristics caused by the proximity of a magnetically permeable or electrically conductive mass.

A secondary object is to provide a practical method for uniform and economical mass fabrication of a stable search head.

Stated in another manner, a primary object of the invention is to provide a novel method of pre-setting or offsetting the coil components in such a compensatory manner that the shrinkage of the encapsulating materials tends to relocate them accurately in their correct operating positions.

Parenthetically, the receive coils are shown in FIG. 2 in circular form as elements 15 and 16, mounted on a board 23', and the transmit coil is shown as element 17. The invention primarily relates to the secure positioning of these coils.

For a better understanding of the present invention, together with other and further objects, advantages, and capabilities thereof, reference is made to the following description of the accompany drawings, in which:

FIGS. 1, 2, and 3 are, respectively top plan, front elevational section, and side elevational section views of a preferred embodiment of a complete search head assembly in accordance with the invention, the sectional FIGS. 2 and 3 being taken along the lines 2—2 and 3—3 of FIG. 1, in each case looking in the direction of the arrows;

FIG. 4 is a fragmentary sectional view taken along plane 4—4 of FIG. 1, looking in the direction of the arrows;

FIG. 5 is a cross-sectional view of the transmitter coil;

Figure 15:
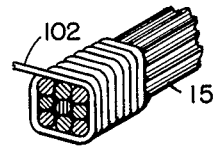
Figure 12:
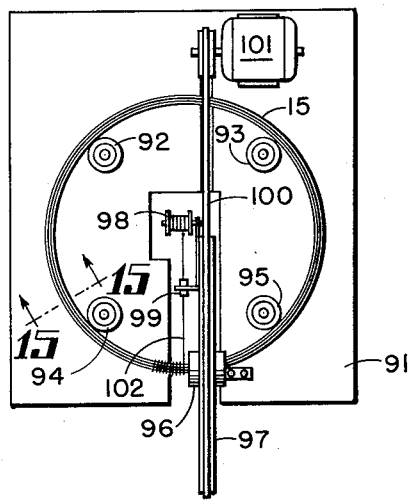
Figure 13:
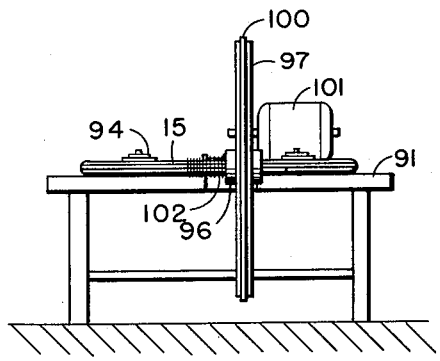
Figure 14:
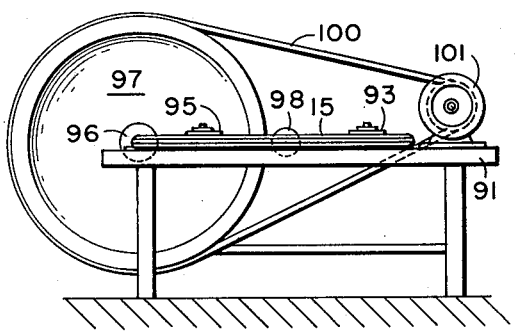

FIGS. 6, 7, and 8 are top plan, front elevational, and side elevational views of the board-and-coils subassembly before encapsulation;

FIG. 9 is a fragmentary sectional view taken along the line 9—9 of FIG. 6;

FIG. 10 is a perspective view of the novel fixture employed in mechanically positioning the coils;

FIG. 11 is a circuit schematic of a circuit used in electrically controlling the positions of the coils;

FIGS. 12, 13, and 14 are top plan, front elevational, and side elevational views of a novel coil winding apparatus used in winding the shielding conductors around the coils; and FIG. 15 is a fragmentary perspective detailed view, partly in section, showing the coil winding and shield relationship.

The search head here described (FIGS. 1-3) features three relatively large air core inductors, the transmit inductor or coil 17 being positioned beneath a board 23 and the two receive inductors 15 and 16 being placed on top of the board and symmetrically located with respect to the transmit coil 17. Each of the coils is multiple-layer wound, of square cross section as indicated in FIG. 15, and encased in a spiral winding. The cross section is very small compared to the loop diameter. The spiral winding is insulated, grounded at one end, and used as an electrostatic shield.

The board 23 is a generally elliptically shaped, fiber glass filled, epoxy laminate. Proper operation of the device calls for the receiving coils 15 and 16 to be so disposed with respect to transmitting coil 17 that the net mutual inductance between the transmitter coil and the receiver coils is zero, in the absence of a target. The invention provides a structure and method such that the desired precise positioning of the coils is achieved and maintained.

The first step in the assembly is to prepare the individual coils. These are wound cylindrically and suitably shaped. Then the spiral shield windings are wrapped around the coils in the manner indicated in FIG. 15. A portion 43 of the spiral winding for coil 15 is illustrated in FIG. 6. It will be understood that the entire winding 43 covers the coil 15, only a part of the winding 43 being shown for purposes of illustration. Parenthetically, FIGS. 12, 13, and 14 show our novel apparatus for wrapping this winding around the coils. There is no direct current connection between the outer spiral winding and the coil. The purpose of such outer winding is to reduce static coupling.

After the three coils have been prepared they are placed on the board 23 and positioned in positive electrical and mechanical relationships. Parenthetically, the fixture for positioning the coils is illustrated in FIG. 10 and will be described hereinbelow.

Referring again to the subassembly of board and coils, electrical terminals 35, 36, 37, 38, 39, 40, and 41 are first affixed to the board in hexagonal formation, with terminal 37 in the center. Coil-securing cement, comprising suitable proportions of resin, curing agent, and silicate filler, is placed on top and on the bottom of the board in suitable circularly shaped deposits for adhering to the coils 15, 16, and 17. Then there are positioned and adhesively secured to the bottom of the board two small semi-circular glass fiber pads 32 and 33. Adhesively secured beneath the pads 32 and 33 is a thermistor 9, which is collateral to the present invention and could be any small component, so far as the invention is concerned. Beneath the thermistor are adhesively secured two small circular pads 30 and 31, as indicated in FIG. 9. The leads of receiving coil 16 are brought out to terminals 39 and 40, and the leads of receiving coil 15 are similarly brought out to terminals 35 and 41. The leads of the transmitter coil are brought out to terminals 36 and 38, the one to terminal 38 being via thermistor 9 and a resistor (collateral to this invention and therefore not further shown). As best illustrated in FIG. 9, the board is formed with complementary grooves which receive the coil leads.

The transmitter coil shield is provided with a ground connection at 37, and the shields of both receiver coils are provided with a grounded connection at 35.

After the leads and shields have been soldered to the appropriate terminals, the subassembly of board and coils is placed in a constant 90 degree centigrade atmosphere and in an area which is free of metal within the detection range of the mine detector, at which time the transmitter coil is energized with an illustrative signal of 1 volt magnitude at 2500 cycles per second.

At this stage the receiver coil assemblies are positioned at an electrical null with respect to the transmitter coil. The position of the receiver coils at this time is the position that they should be in during actual practical operation of the device. However, prior to the completion of the device the subassembly of board and coils must be encapsulated, and shrinkage occurs during the molding process. In accordance with the invention, as soon as the desired electrical null position is reached on test (before encapsulation), the receiver assemblies are displaced apart so that each of the two receiver coils produces a net electrical output of, say, 150 microvolts. These output values are maintained on test for a period of 45 minutes, and the receiver coil positions are adjusted as necessary in order to maintain such individual electrical outputs, which output is indicative of a displacement compensatory of the anticipated shrinkage. Parenthetically, the net result of this offsetting is that the shrinkage caused by encapsulation brings the coils back to near the desired electrical null position.

Then the subassembly is permitted to remain undisturbed for an additional period of, say 2 hours and 15 minutes, sufficient to permit the setting of the coil-securing cement. Finally the subassembly of board and coils is quickly placed in a 90 degree centigrade atmosphere for storage.

As previously stated, the above-mentioned positioning is accomplished in our novel fixture illustrated in FIG. 10.

Referring now specifically to FIG. 4 of the drawings, there is shown in section a view of th ecomplete search head assembly comprising the following elements, superimposed on top of each other in the order named: a glass fiber bottom cloth 20, a glass fiber cloth pad 21, two glass fiber barrier cloths 22, the board 23, four glass fiber cloth inserts 24 having the same shape as the laminate 26, a glass fiber top cloth 27.

The elements 20, 22, 23, 25, and 27 are all of generally elliptical pattern.

The encapsulating compound is indicated by the reference numeral 28. It will be understood that in FIGS. 2 and 3 the reference numeral 23' collectively designates the board 23 and associated cloths coextensive in area with the board, this expedient being employed in order to avoid unnecessary reference to details. The reference numeral 28, wherever applied, represents the encapsulating material.

Referring now to the procedure for molding the subassembly of coils, board, and cloth components into the final assembly, it is first subjected in a mold to mechanical pressure on all areas other than the three coils, to achieve a rigid, sandwich-like construction, whereupon the assembly is heated uniformly over all surfaces to 90 degrees centigrade temperature. This temperature is maintained constant throughout the molding, vacuumizing, and pressurizing procedures. Next the assembly is subjected to a vacuum of not less than 29 inches of mercury, the vacuum being applied at suitable terminal and vent locations. At this stage the encapsulating compound is introduced under a pressure of 10 pounds per square inch, at the terminal locations, while maintaining the vacuum at the vent locations, the compound being permitted to flow until the resin distribution is complete, precautions being taken to prevent gas or vapor flow. Then the pressure is reduced to 29 inches of mercury or less at the terminal and vent locations and maintained for a period of 10 minutes. There follows an increase in pressure at the terminal and vent locations to 45 pounds per square inch, and this pressure is maintained for a period of two or three minutes and then reduced to atmospheric.

The assembly is next permitted to remain in an undisturbed condition for a period of about three hours, and successively placed in 150 degree centigrade and 90 degree centigrade ambient conditions and finally cooled down to normal room temperature.

The encapsulating materials employed may be epoxy resins or similar thermosetting compounds. Conventional molding techniques are here employed, and no novelty is claimed for them per se.

The machine for placing the wrap-around shielding winding on the coils is shown in FIGS. 12-14. The unique feature of this apparatus resides in the fact that the wire is wound between the face of a split bearing 96 and the previously wound turns in such a way that the wedging action of the turn being applied serves to rotate the coil just enough to accept that turn. The coil 15, for example, is supported by a groove in the split bearing 96 and by a plurality of resilient rolls 92, 93, 94, and 95. As indicated above, the wedging action of each turn of wire as applied causes the toroidal coil to move angularly (i.e., clockwise as shown in FIG. 12) in the horizontal plane, making way for the turn being applied. The element 96 is the split bearing, rigidly secured to the base plate 91. Mounted for rotation on the split bearing is a split pulley 97 which has rigidly secured thereto for rotation with the pulley a wire supply spool 98 and suitable tensioning and guiding means 99 for the wire. As the wheel 97 is driven in a clockwise direction by belt 100 and motor 101, the wire 102 is wrapped around the coil, as will be apparent from the foregoing description.

The coil positioning jig is illustrated in FIG. 10. It comprises a base plate 50 on which is placed the search head board 23, which is secured and clamped in place by appropriate clamps 51, 52, 53, and 54. The receiving coils 15 and 16 are maintained in contour and held down by plates 55 and 56. The two arrangements by which the coils are adjustably positioned along the longitudinal axis of the search head board 23 are identical, and the discussion is therefore confined to one (front one in FIG. 10) as representative.

The longitudinal position of coil 15 is determined by moving a retainer 57 away from or toward a retainer 58. This is accomplished by a differential screw, provided with a hand wheel 59, which is threaded into suitable threaded openings carried by the members 57 and 58. That portion of differential screw and handwheel assembly 59 which cooperates with member 57 has a right-hand pitch screw thread 60, while the screw thread which cooperates with member 58 has a right-hand pitch screw thread 14 of a different pitch. The longitudinal displacement of the coil is a function of the thread differential, and this provides a vernier effect, whereby the longitudinal position of coil 15 is closely controlled.

A pressure bar 61 is mounted in engagement with supports 62 and 63 in such a manner as to exert a downward force against retainer 57 and plate 55. The retainer 57 is provided with a suitable guide (not shown) to prevent lateral displacement, so that the coil position is adjusted only axially on the search head board.

Coil 16 is positioned in a similar manner by means shown on the right side of FIG. 10.

After the coils have been accurately positioned and cemented to the board 23, the subassembly of board and coils is then molded in the manner previously described.

Reference is made to FIG. 11 for a description of the circuitry employed in positioning the search head coils. A signal of appropriate frequency and wave form is applied by source 70 to the transmitter coil 17 through transformer 71. The signal is simultaneously applied to a bridge network comprising resistors 72, 73, 76, and 77, the junction of resistors 72 and 73 being grounded at 74 and resistor portions 76 and 77 being combined to form a potentiometer 75 having a movable contact 78 connected in series with resistors 79 and 80. The junction of these two resistances is connected, through the primary of transformer 87 and capacitor 86, to a switch terminal 81. Switch terminal 82 is grounded.

One side of each of the receiver coils is encircuited with a terminal 84, and the other sides of the receiver coils are separately encircuited with terminals 83 and 85.

When coil 15 is being positioned, switch contacts 81 and 82 are placed in circuit with contacts 83 and 84. When coil 16 is being positioned, switch contacts 81 and 82 are placed in circuit with terminals 85 and 84. Once these connections have been established, the positions of the receiver coils are adjusted by use of the fixture shown in FIG. 10 until null indications are furnished by each receiver coil.

The null indications are furnished by voltmeter 89, which is coupled to the secondary of transformer 87 via an amplifier 88.

We have found that the insulated helical winding which is placed on each of the coils functions as a director or reflector. Such director or reflector is driven by the coil and possesses particularly desirable directional characteristics, the pattern extending vertically downward from each coil in the form of a narrow lobe. Each of the three coils, with its insulated winding, is characterized by such a directional pattern. Such a combination of coil and closely wound insulated helix functions as a very effective radiator or receiving antenna.

While there has been shown and described what is at present considered to be the preferred embodiment of the invention, it will be understood by those skilled in the art that various modifications and changes may be made therein without departing from the proper scope of the invention as defined by the appended claim.

We claim:

The method of making a search head for a metals detector which comprises the steps of positioning, on a board, a transmitter coil in an offset plane with respect to two coplanar receiver coils spaced symmetrically to overlap said transmitter coil; applying electrical signals directly to the transmitter coil and adjusting the position of one receiver coil, while measuring the signal voltage induced in it, until such signal voltage becomes zero; linearly displacing said receiver coil further away from the transmitter coil until such signal voltage attains a predetermined value proportioned to the displacement of said receiver coil away from its zero voltage position; applying electrical signals directly to the transmitter coil and adjusting the position of the other receiver coil, while measuring the signal voltage induced in it, until such zero voltage becomes zero; linearly displacing said other receiver coil further away from the transmitter coil until such signal voltage attains a predetermined value proportioned to the displacement of said other receiver coil away from its zero voltage position; surrounding the assembly of coils and board with encapsulating compound; pressure-molding the compound and assembly into a unitary product; heating the product; and finally cooling the product to room temperature, the above-mentioned values being predetermined in accordance with the counter-displacement of said receiver coils caused by shrinkage in encapsulating, heating, and cooling.

References Cited in the file of this patent

UNITED STATES PATENTS

| | | |
|---|---|---|
| 1,643,998 | Scott | Oct. 4, 1927 |
| 2,495,579 | Ferris et al. | Jan. 24, 1950 |
| 2,657,312 | Saranga | Oct. 27, 1953 |
| 2,693,635 | Chapman et al. | Nov. 9, 1954 |
| 2,769,224 | Hake | Nov. 6, 1956 |
| 2,793,817 | Clarke et al. | May 28, 1957 |
| 2,793,818 | Clarke et al. | May 28, 1957 |
| 2,871,549 | Arnold | Feb. 3, 1959 |
| 2,872,723 | Levine et al. | Feb. 10, 1959 |

UNITED STATES PATENT OFFICE

CERTIFICATION OF CORRECTION

Patent No. 3,002,262                           October 3, 1961

Andrew Demopoulos et al.

It is hereby certified that error appears in the above numbered patent requiring correction and that the said Letters Patent should read as corrected below.

Column 1, line 53, for "conductive" read -- conducting --; column 6, line 21, for "zero" read -- signal --.

Signed and sealed this 3rd day of April 1962.

(SEAL)
Attest:

ERNEST W. SWIDER                                       DAVID L. LADD

Attesting Officer                                   Commissioner of Patents